United States Patent
Hammami et al.

(10) Patent No.: US 8,439,106 B2
(45) Date of Patent: May 14, 2013

(54) LOGGING SYSTEM AND METHODOLOGY

(75) Inventors: Ahmed Hammami, Edmonton (CA);
Todd Yakimoski, Beaumont (CA);
Bernadette Craster, Edmonton (CA);
John Richard Anthony Pearson, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 495 days.

(21) Appl. No.: 12/721,375

(22) Filed: Mar. 10, 2010

(65) Prior Publication Data
US 2011/0042075 A1 Feb. 24, 2011

(51) Int. Cl.
*E21B 47/01* (2012.01)
(52) U.S. Cl.
USPC .............. 166/57; 166/302; 166/250.01
(58) Field of Classification Search ........... 166/57, 166/250.01, 302, 66.5, 69
See application file for complete search history.

(56) References Cited

U.S. PATENT DOCUMENTS

| | | | | |
|---|---|---|---|---|
| 2,433,554 A * | 12/1947 | Herzog | ........................ | 250/261 |
| 3,038,074 A * | 6/1962 | Scherbatskoy | ................ | 250/261 |
| 3,080,478 A * | 3/1963 | Scherbatskoy | ................ | 250/261 |
| 3,149,230 A * | 9/1964 | Hall, Jr. | ........................ | 250/268 |
| 3,240,937 A * | 3/1966 | McKay et al. | ................ | 376/165 |
| 3,254,217 A * | 5/1966 | Youmans | .................... | 250/261 |
| 3,265,893 A * | 8/1966 | Rabson et al. | ................ | 250/261 |
| 3,452,201 A * | 6/1969 | Hall Jr. | ........................ | 376/166 |
| 3,488,970 A * | 1/1970 | Hallenburg | .................... | 62/3.2 |
| 3,496,360 A * | 2/1970 | Dewan | ........................ | 250/261 |
| 3,859,523 A * | 1/1975 | Wilson et al. | ................ | 250/261 |
| 4,248,298 A * | 2/1981 | Lamers et al. | ................ | 166/57 |
| 4,375,157 A * | 3/1983 | Boesen | ........................ | 62/49.2 |
| 4,407,136 A * | 10/1983 | de Kanter | ................ | 62/64 |
| 4,440,219 A * | 4/1984 | Engelder | ................ | 166/57 |
| 4,513,352 A * | 4/1985 | Bennett et al. | ................ | 361/700 |
| 4,559,790 A * | 12/1985 | Houston | ................ | 62/259.3 |
| 4,568,830 A * | 2/1986 | Stromswold et al. | ........ | 250/261 |
| 4,773,952 A * | 9/1988 | Wesley, Jr. | ................ | 156/191 |
| 4,795,580 A | 1/1989 | Hormansdorfer | | |
| 5,236,773 A * | 8/1993 | Sorathia et al. | ................ | 428/213 |

(Continued)

FOREIGN PATENT DOCUMENTS

| | | |
|---|---|---|
| EP | 0129954 A1 | 1/1985 |
| EP | 0754744 A1 | 1/1997 |
| WO | 2004013574 A2 | 2/2004 |

OTHER PUBLICATIONS

Moritis, G. "PDO Initiates Various Enhanced Oil Recovery Approaches", Oil & Gas Journal. Nov. 5, 2007,105, 411 pp. 56-65.

(Continued)

*Primary Examiner* — Daniel P Stephenson
(74) *Attorney, Agent, or Firm* — Robert A. Van Someren; Wayne I. Kanak

(57) ABSTRACT

A technique facilitates the logging of hot, subterranean environments with a variety of logging tools. Logging tools with temperature limit ratings may be employed in environments that would otherwise be detrimental to operation of the logging tool due to the heat. The logging tool may be protected through placement of the tool at a desired location within a non-metallic flask. The logging tool also is surrounded with an insulating material and/or a material with a high heat of fusion disposed within the non-metallic flask to increase the time span for operating the logging tool in the hot, subterranean environment.

28 Claims, 4 Drawing Sheets

U.S. PATENT DOCUMENTS

| | | | | |
|---|---|---|---|---|
| 5,243,835 A * | 9/1993 | Padamsee | | 62/457.2 |
| 5,265,677 A | 11/1993 | Schultz | | |
| 5,346,570 A * | 9/1994 | Warden et al. | | 156/191 |
| 5,547,028 A * | 8/1996 | Owens et al. | | 166/302 |
| 5,589,657 A * | 12/1996 | Gessel et al. | | 102/202.14 |
| 5,715,895 A | 2/1998 | Champness et al. | | |
| 6,119,777 A * | 9/2000 | Runia | | 166/254.2 |
| 6,336,408 B1 * | 1/2002 | Parrott et al. | | 102/312 |
| 6,341,498 B1 * | 1/2002 | DiFoggio | | 62/259.2 |
| 6,769,487 B2 * | 8/2004 | Hache | | 166/302 |
| 6,877,332 B2 | 4/2005 | DiFoggio | | |
| 6,978,828 B1 * | 12/2005 | Gunawardana | | 165/104.26 |
| 7,008,232 B2 * | 3/2006 | Brassel | | 434/268 |
| 7,017,662 B2 | 3/2006 | Schultz et al. | | |
| 7,258,169 B2 * | 8/2007 | Fripp et al. | | 166/302 |
| 7,308,795 B2 * | 12/2007 | Hall et al. | | 62/3.2 |
| 7,347,267 B2 | 3/2008 | Morys et al. | | |
| 7,440,283 B1 * | 10/2008 | Rafie | | 361/709 |
| 7,540,165 B2 * | 6/2009 | DiFoggio et al. | | 62/259.2 |
| 7,571,770 B2 | 8/2009 | DiFoggio et al. | | |
| 7,647,979 B2 * | 1/2010 | Shipley et al. | | 166/381 |
| 7,673,566 B2 * | 3/2010 | Han et al. | | 102/312 |
| 7,921,913 B2 * | 4/2011 | Tchakarov et al. | | 166/302 |
| 7,931,086 B2 * | 4/2011 | Nguyen et al. | | 166/302 |
| 2002/0091489 A1 | 7/2002 | Ye et al. | | 702/6 |
| 2004/0112601 A1 * | 6/2004 | Hache | | 166/302 |
| 2005/0016548 A1 * | 1/2005 | Brassel | | 128/898 |
| 2005/0038199 A1 | 2/2005 | Wang et al. | | |
| 2005/0284613 A1 * | 12/2005 | Gunawardana | | 165/104.26 |
| 2006/0060355 A1 * | 3/2006 | Bell et al. | | 166/298 |
| 2006/0191682 A1 * | 8/2006 | Storm et al. | | 166/250.01 |
| 2006/0213660 A1 * | 9/2006 | DiFoggio et al. | | 166/254.2 |
| 2006/0213669 A1 * | 9/2006 | Shipley et al. | | 166/381 |
| 2007/0095096 A1 * | 5/2007 | DiFoggio et al. | | 62/480 |
| 2007/0095543 A1 * | 5/2007 | Tchakarov et al. | | 166/380 |
| 2007/0154738 A1 * | 7/2007 | Ganguly et al. | | 428/698 |
| 2007/0235193 A1 | 10/2007 | Hoffarth | | |
| 2008/0150524 A1 * | 6/2008 | Song et al. | | 324/303 |
| 2008/0188924 A1 * | 8/2008 | Prabhu | | 623/1.16 |
| 2008/0227665 A1 * | 9/2008 | Ezell et al. | | 507/121 |
| 2008/0230203 A1 * | 9/2008 | Christ et al. | | 165/10 |
| 2008/0277162 A1 * | 11/2008 | DiFoggio | | 175/17 |
| 2008/0314638 A1 | 12/2008 | Kaul et al. | | |
| 2009/0090500 A1 * | 4/2009 | Damsleth et al. | | 166/57 |
| 2009/0167302 A1 | 7/2009 | Edwards et al. | | |
| 2009/0188666 A1 * | 7/2009 | Habib et al. | | 166/250.01 |
| 2009/0200013 A1 | 8/2009 | Craster et al. | | |
| 2009/0236091 A1 | 9/2009 | Hammami et al. | | |
| 2010/0147523 A1 * | 6/2010 | Difoggio | | 166/302 |
| 2012/0152545 A1 * | 6/2012 | Takeda et al. | | 166/302 |

OTHER PUBLICATIONS

Bybee, Karen "Steam Injection in Fractured Carbonate Reservoirs", JPT, Apr. 2007, pp. 82-84.

Shahin Jr., G.T. et al "The Physics of Steam Injection in Fractured Carbonate Reservoirs: Engineering Development Options That Minimize Risk", SPE 102186, Sep. 2006 SPE Annual technical Conference and Exhibition, San Antonio, Texas, pp. 24-27.

Kakiuchi, H. et al, "A Study of Erythritol as Phase Change Material", IEA Annex 10—PCMs and Chemical Reactions for Thermal Energy Storate, 2nd Workshop, Nov. 11-13, 1998, Sofia, Bulgaria.

PCT International Search Report and Written Opinion of PCT Application Serial No. PCT/IB2011/050476 dated May 2, 2012.

* cited by examiner

| Substance | Melting Point (°C) | Density (kg/dm³) | Melting Enthalpy (kJ/kg) | (kJ/dm³) |
|---|---|---|---|---|
| Threitol (T) | 71 | 1.46 | 223 | 326 |
| Erythritol (E) | 119 | 1.46 | 334 | 488 |
| D-Mannitol (M) | 167 | 1.50 | 306 | 459 |
| Dulcitol (D) | 189 | 1.50 | 358 | 537 |
| Eutectica (+) | | | | |
| M/D 50:50 | 153 | 1.50 | 282 | 423 |
| E/M 80:20 | 113 | 1.50 | | |
| E/D 80:20 | 115 | 1.50 | | |
| E/M/D 80:10:10 | 109 | 1.50 | 274 | 411 |

Numbers indicate the molecular ratio of the eutectic mixture.

LOGGING SYSTEM AND METHODOLOGY

BACKGROUND OF THE INVENTION

In many oilfield applications, logging equipment is used to gain a better understanding of a specific subterranean formation. For example, a logging tool may be deployed downhole into a wellbore via a wireline and operated to determine characteristics of the surrounding formation. However, logging equipment often is rated for a certain temperature limit above which the equipment is susceptible to damage. As a result, difficulties may arise in utilizing logging equipment in a variety of high temperature well applications, such as enhanced oil recovery operations involving steam injections.

Throughout the world, an increasing number of enhanced oil recovery projects are being employed to recover hydrocarbon fluids, such as oil. A substantial percentage of the enhanced oil recovery projects and enhanced oil recovery oil production results from the application of thermal recovery methods. Thermal recovery primarily utilizes steam injection techniques to recover heavy oil, and such techniques are growing in popularity and importance as an approach to meeting global oil demand.

During enhanced oil recovery operations, monitoring of formation properties in substantial detail at different spatial locations can be important. The monitoring is achieved through placement of permanent sensors and/or logging tools to obtain the desired measurements. However, the high temperatures prevailing in many of these operations can limit the feasibility of using logging tools in obtaining the desired information.

For example, thermal-assist gas-oil gravity-drainage (TAGOGD) techniques are employed for recovering heavy oil in heavily fractured carbonate formations, but such techniques employ substantial heat. In some applications, TAGOGD techniques substantially improve oil recovery rates, but the heavy oil must be heated to reduce its viscosity and to allow it to drip/drain downwardly via gravity. Oil extracted from the carbonate formation accumulates in a fractured oil rim, from which it may be produced through wells intersecting the fractured region. In this type of application, it is important to monitor and manage the oil rim position and thickness, however, the injection of steam to heat the formation restricts the use of conventional reservoir monitoring/logging tools.

BRIEF SUMMARY OF THE INVENTION

In general, the present invention provides a technique for enabling the logging of hot, subterranean environments with a variety of logging tools. According to one embodiment, a logging tool is positioned at a desired location within a non-metallic flask. The logging tool is surrounded with an insulating material and/or a material with a high heat of fusion, e.g. phase change material, disposed within the non-metallic flask to increase the time duration available for operating the logging tool in the hot, subterranean environment.

BRIEF DESCRIPTION OF THE DRAWINGS

Certain embodiments of the invention will hereafter be described with reference to the accompanying drawings, wherein like reference numerals denote like elements, and.

DETAILED DESCRIPTION OF THE INVENTION

Figure 1:
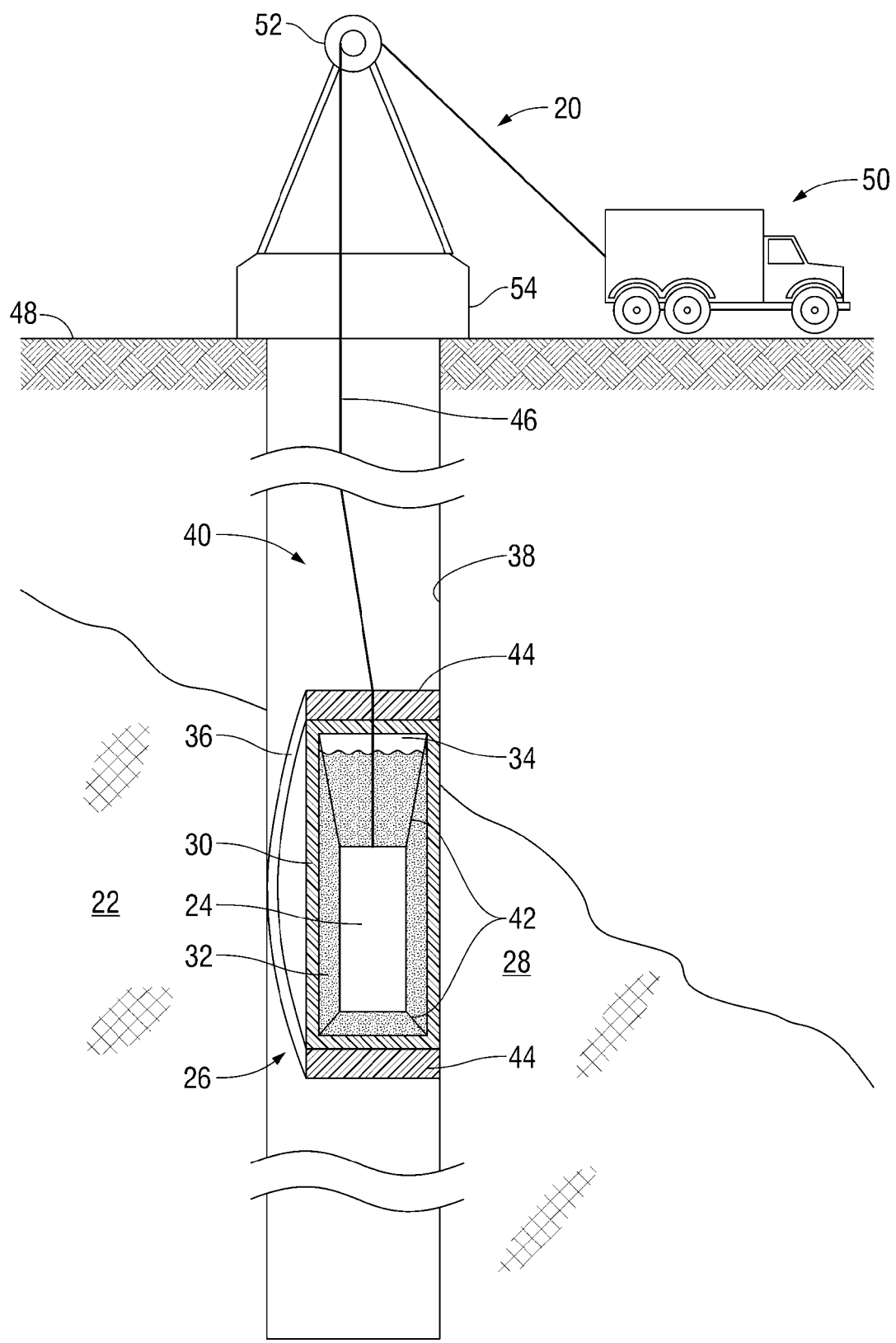
FIG. 1 is a schematic illustration of a logging system employed along a subterranean formation, according to an embodiment of the present invention.

In the following description, numerous details are set forth to provide an understanding of the present invention. However, it will be understood by those of ordinary skill in the art that the present invention may be practiced without these details and that numerous variations or modifications from the described embodiments may be possible.

The present invention relates to a system and methodology for protecting logging tools to enable extended use of the logging tools in hot, subterranean environments. The technique allows use of a logging tool, having a temperature limit rating, in an environment which is at a temperature higher than the temperature limit rating of the tool. The logging tool is protected by a phase change material or other insulating material which, in turn, may be contained by a surrounding flask. In many applications, the phase change material and/or surrounding flask extend the period of time over which the logging tool may be used to detect formation related parameters in the hot, subterranean environment. Depending on the logging requirements, the logging tool may be moved periodically to a cooler subterranean region or may be pulled out of the well to enable cooling of the phase change material and logging tool before being returned to the hot, subterranean region for continued performance of the logging operation.

In one example, the flask is formed from a high temperature, non-metallic material and may be constructed as a non-metallic and non-magnetic fiber-reinforced plastic flask. The flask is combined with a suitable phase change material to effectively insulate one or more downhole tools, such as a logging tool. In some applications, the phase change material is used in cooperation with a logging tool having internal heat generating sections. Examples of such logging tools include nuclear magnetic resonance, induction, and/or nuclear logging tools. The phase change material acts as a heat sink for the heat generated by the heat generating sections of the logging tool. Consequently, the phase change material is able to store the generated heat to enable extended logging times in environments that are at or above the temperature limit rating, e.g. above 150° C., for a logging tool. The system may be used in a variety of subterranean applications. However, one example of a useful application is employing the logging tool system in open hole observation wells used during enhanced oil recovery applications involving steam injection.

According to one embodiment, the flask is a non-metallic and non-conductive fiber-reinforced plastic flask, and the phase change material is a suitable sugar alcohol-based phase change material which cooperates with the flask to effectively insulate wireline logging tools in high temperature downhole environments. The phase change material is characterized by a relatively low thermal conductivity and high latent heat of fusion fit-for-purpose which, in combination with the fiber-reinforced plastic flask, provides effective thermal insulation of the wireline tools. This insulation of the wireline tool enables extended logging times at temperatures well above the temperature rating, e.g. 150° C., of the logging tool. These high temperature environments may be encountered in many types of well applications, including the open hole observation wells for enhanced oil recovery operations involving steam injection discussed above.

Additionally, the non-metallic flask is designed to avoid interference with operation of the logging tool. Depending on the type of logging tool or tools employed in the overall logging system, the material of the flask may be selected to avoid interference with detection and observation of the desired reservoir parameters. Use of a fiber-reinforced plastic flask, for example, provides a flask which is effectively transparent with respect to nuclear magnetic resonance, induction, and/or nuclear logging tools up to their maximum operating temperatures.

Referring generally to FIG. 1, an example of a logging system 20 is illustrated as deployed to detect and monitor desired formation parameters in a hot, subterranean formation 22. In this example, logging system 20 comprises a logging tool 24 which is enclosed in a logging tool protection assembly 26. The logging tool protection assembly 26 is designed to insulate logging tool 24 from high temperatures in a logging region 28 within formation 22.

In the embodiment illustrated, logging tool protection assembly 26 comprises a flask 30 surrounding logging tool 24. The flask 30 protects logging tool 24 from formation heat, but also serves to contain an insulating material, such as a phase change material 32. Logging tool 24 may be fully submerged in the phase change material 32, which is generally placed in flask 30 in a molten state, however a space or volume 34 may be provided within flask 30 to accommodate thermal expansion of the phase change material 32 when heated by the logging tool 24 and/or surrounding formation 22. Additionally, the logging tool protection assembly 26 may include a pressure compensation system to prevent collapse of the flask 30 in high pressure wells or ingress of wellbore fluids into the flask 30. Such a pressure compensation system may include pressuring the space or volume 34 inside flask 30 with an inert gas, such as nitrogen or argon.

In some applications, the logging tool protection assembly 26 also may comprise an eccentralizer 36, e.g. a spring member, to bias the flask 30 against a desired wall region 38 of a wellbore 40 (or of another subterranean space) into which logging tool 24 is deployed. To further facilitate accurate monitoring of the desired subterranean parameters, the logging tool 24 is positioned at a desired location within non-metallic flask 30 via a tool positioner 42. By way of example, tool positioner 42 may comprise locks or a tool centralizer mechanism able to generally centralize logging tool 24 along a longitudinal axis of the flask 30. In other words, tool positioner 42 can be used to radially centralize logging tool 24 within flask 30. The logging tool protection assembly 26 may also comprise protective end caps 44 to limit abrasion damage as the logging tool protection assembly 26 is moved along wellbore 40. By way of example, the end caps 44 comprise abrasion resistant caps mounted at longitudinal ends of the non-metallic flask 30.

The logging tool 24 and the logging tool protection assembly 26 may be lowered to the logging region 28 via a cable 46, such as a wireline. For example, wireline 46 is used to deliver logging tool protection assembly 26 to the logging region 28 of a hydrocarbon-bearing zone. The wireline 46 also is used to retrieve logging tool protection assembly 26 back to a surface location 48 which may be an earth surface location or a rig platform. Other forms of conveyance, such as slick line, jointed pipe, and coiled tubing, may also be used to move logging tool 24 and logging tool protection assembly 26 into and out of the wellbore.

During a logging operation, wireline 46 is connected between a logging truck/surface equipment 50 at the surface location 48. The logging truck/surface equipment 50 receives data from logging tool 24 after the logging tool protection assembly 26 is lowered to the desired subterranean logging region 28. The wireline 46 is routed through appropriate surface cable handling equipment 52 positioned above wellbore 40 to facilitate deployment of logging tool protection assembly 26 through a surface blowout preventer/lubricator 54. The flask 30 is appropriately sized to enable movement of the logging tool protection assembly 26 through the wellbore 40 and the blowout preventer/lubricator 54 during deployment and retrieval of logging tool 24.

Figure 2:
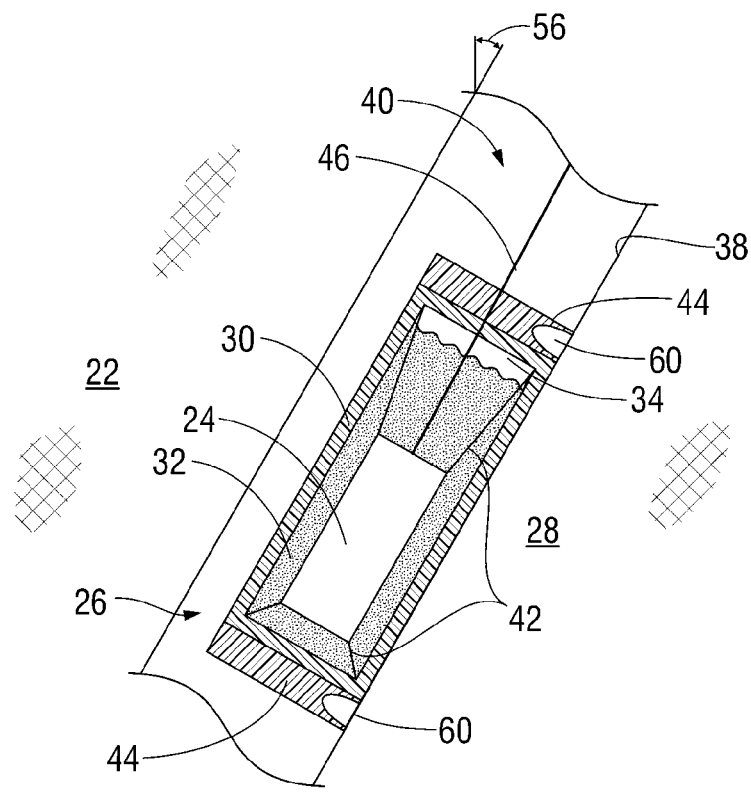
FIG. 2 is a schematic illustration of an alternate embodiment of the logging system employed in a subterranean formation, according to an embodiment of the present invention.

Referring generally to FIG. 2, another embodiment of the logging tool protection assembly 26 is illustrated. In this embodiment, the eccentralizer 36 is absent, as gravity holds the logging tool protection assembly 26 against the wall region 38 since wellbore 40 is drilled at an angle 56. By way of example, wellbore 40 may be drilled at a deviation of 5 degrees or more from the vertical. The deviated wellbore 40 causes gravity to move flask 30 against the desired wellbore wall region 38 to facilitate logging of the formation 22 through the wall region 38.

Figure 3:
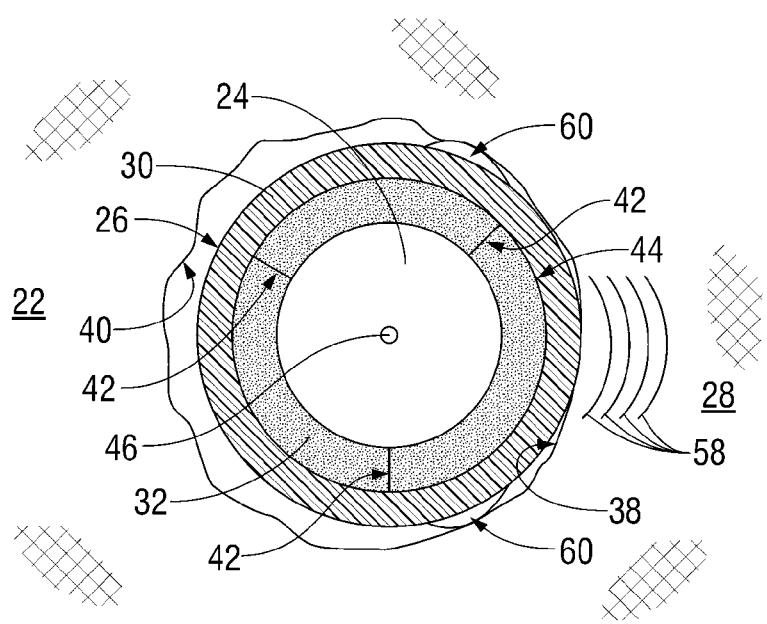
FIG. 3 is a cross-sectional view of the logging system illustrated in FIG. 2, according to an embodiment of the present invention.

As further illustrated in FIG. 3, movement of the logging tool protection assembly 26 against the wellbore wall region 38 facilitates monitoring of the desired formation parameters to a plurality of depths of investigation 58 in the desired direction. A plurality of protective pads 60 may be positioned along the side of flask 30 which is oriented toward wellbore wall region 38. The pads 60 protect flask 30 against undue abrasion and damage which might otherwise result from friction with the wellbore wall. The pads 60 may be weighted to help maintain the logging tool protection assembly 26 in contact with the desired wellbore wall region 38. Weighted pads 60 also tend to naturally rotate the logging tool 24 in the wellbore 40 to properly orient the logging tool toward the lower side of the wellbore 40 and thus toward wellbore wall region 38. In some applications, the pads 60 are designed and installed flush with the end caps 44. This ensures that they are aligned with the logging tool's sonde and/or logging sensors to ensure easy passage through the blowout preventer/lubricator 54 and to ensure a desired shift in the center of gravity of logging tool protection assembly 26. Alternatively, the weighted pads 60 may be installed flush above and below the end caps 44 in axial alignment with the logging tool's sonde/sensor side to facilitate a desired shift in the center of gravity of logging tool protection assembly 26.

The various components of logging system 20 may be designed for specific high temperature, subterranean logging applications. For example, the non-metallic flask 30 may be designed as a fiber-reinforced plastic flask which is electromagnetically transparent. This allows the flask 30 to house and effectively insulate nuclear magnetic resonance logging tools, such as an MR Scanner™ tool, available from Schlumberger Technology Corporation of Sugar Land, Tex., USA.

In one specific example, the flask material and phase change material are selected to enable the logging tool 24 to survive and operate for a desired period of time, e.g. two hours, during a logging operation in an open hole well exposed to steam at a temperature of, for example, 250° C. In this example, the logging tool 24 may be employed to detect and confirm oil saturation changes. In some environments, multiple fluids, e.g. oil, gas, connate water, steam, and condensed steam, can exist in the fluid matrix. The ability to provide long term operation of logging tool 24 in the hot environment enables the use of nuclear magnetic resonance logging to distinguish many of these fluids occupying large pores (e.g. oil, gas, condensed steam) and to detect original connate brine in small pores. A nuclear magnetic resonance derived viscosity gradient may also be determined and used to provide supplemental information (such as the oil viscosity gradient beneath the steam chest) on the performance of a TAGOGD process.

By protecting the logging tool 24 from environmental heat and internally generated heat, the logging tool protection assembly 26 enables the use of a variety of logging tools, including existing logging tools, in high temperature environments without significant redesign and/or modification. The size and component materials of the logging tool protection assembly 26 may be selected according to the characteristics of the logging tool and the logging location. For example, the annular gap between the logging tool 24 and the surrounding flask 30 is often made as large as possible, but the flask 30 must be able to move along the wellbore 40. The size of flask 30 affects the amount of phase change material which is introduced to submerge the logging tool 24. Depending on the type of phase change material selected (e.g. sugar alcohols, mixtures thereof, and/or other suitable phase change materials), the size of space 34 must also be coordinated to provide sufficient room for thermal expansion of the phase change material. By way of example, space 34 may comprise 10 percent of the volume of non-metallic flask 30.

Although logging tool 24 need not be submerged in phase change material for every application, submerging logging tool 24 under a sizable column of phase change material 32 can be beneficial in protecting the logging tool from undue heat. As the phase change material 32 above logging tool 24 melts, the phase change material 32 moves down around the logging tool 24 due to gravity, and continually cools the logging tool 24. This design facilitates convection cooling and helps extend the time over which the logging tool 24 can be safely operated in, for example, a harsh, hot, wet, open hole observation well with subsurface temperatures substantially in excess of 150° C. Additionally, to further enhance protection of logging tool 24, thermocouples may be positioned within logging tool protection assembly 26 and/or within logging tool 24 to monitor protection assembly and tool temperatures so that the logging tool 24 can be retrieved from the well before it reaches its design temperature and sustains damage due to overheating.

Figures 4, 5:
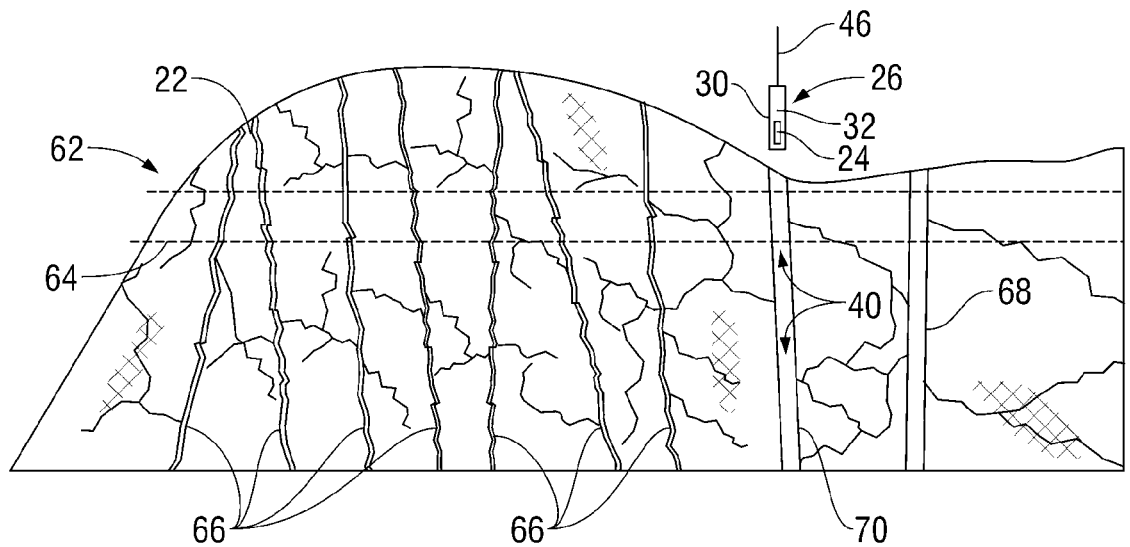
FIG. 4 is a schematic illustration showing use of the logging system in one example of an enhanced oil recovery operation, according to an embodiment of the present invention.
FIG. 5 is a table illustrating properties of phase change material examples, according to an embodiment of the present invention.

The logging tool protection assembly 26 may be utilized in many types of oil recovery operations and other operations subject to high temperatures at subterranean locations to be logged. One example of an application amenable to use of the logging tool protection assembly 26 is illustrated in FIG. 4. In this example, subterranean formation 22 comprises an oil-containing reservoir region 62. Reservoir region 62 may comprise an oil rim 64 intersected by a plurality of fractures 66 through which steam is introduced to heat heavy oil found in reservoir region 62. The heating sufficiently lowers the viscosity of the oil to allow drainage of the oil to a lower collection region from which it can be pumped through a production wellbore 68. The injection of steam in this type of enhanced oil recovery application creates high temperature subterranean regions. The design of logging tool protection assembly 26 nevertheless enables these regions to be logged by deploying the logging tool protection assembly 26 downhole through one or more appropriate observation wells 70. Additionally, the logging tool protection assembly 26 is amenable to use in a variety of other enhanced oil recovery applications and other well/subterranean-related applications in which it is desirable to monitor parameters over an extended period of time in a hot, subterranean location.

The flask 30 may be constructed from a fiber-reinforced plastic material. Such materials are inherently anisotropic in mechanical and thermal properties which enable the materials to have physico-mechanical properties on par with traditional metals in wellbore applications. An example of a fiber-reinforced plastic material useful in the present application is a bismaleimide (BMI) material with glass fibers, the BMI material having a glass transition temperature well above 250° C. In addition to glass fibers, the fibers may comprise basalt fibers or aramid fibers, or any combination of such fibers. This type of material exhibits relatively low thermal conductivity which is roughly two orders of magnitude lower than the values associated with metals. The fiber-reinforced plastic materials may be coated with high temperature protective layers that present a barrier to fluid, and which are also inherently transparent to electromagnetic logging tools. High temperature fiber-reinforced plastic materials work well in the present application to insulate downhole logging tools during thermal enhanced oil recovery surveillance and monitoring applications involving steam injection.

In some applications, the insulating capacity of high temperature fiber-reinforced plastic materials, such as those used to form flask 30, can be further enhanced/augmented with commercially available, very low thermal conductivity materials, such as glass wool. The insulating capacity of the logging tool protection assembly 26 may also be improved with a high latent heat phase change material having a melting point in a temperature range corresponding with the heat transfer expected to occur during the logging operation and consistent with the operating temperature rating of the logging tool to be protected. Unlike glass wools and other low conductivity insulating materials, phase change materials also serve as heat sinks which effectively dissipate/absorb internal heat generated by the logging tool 24 during the logging operation.

Figure 6:
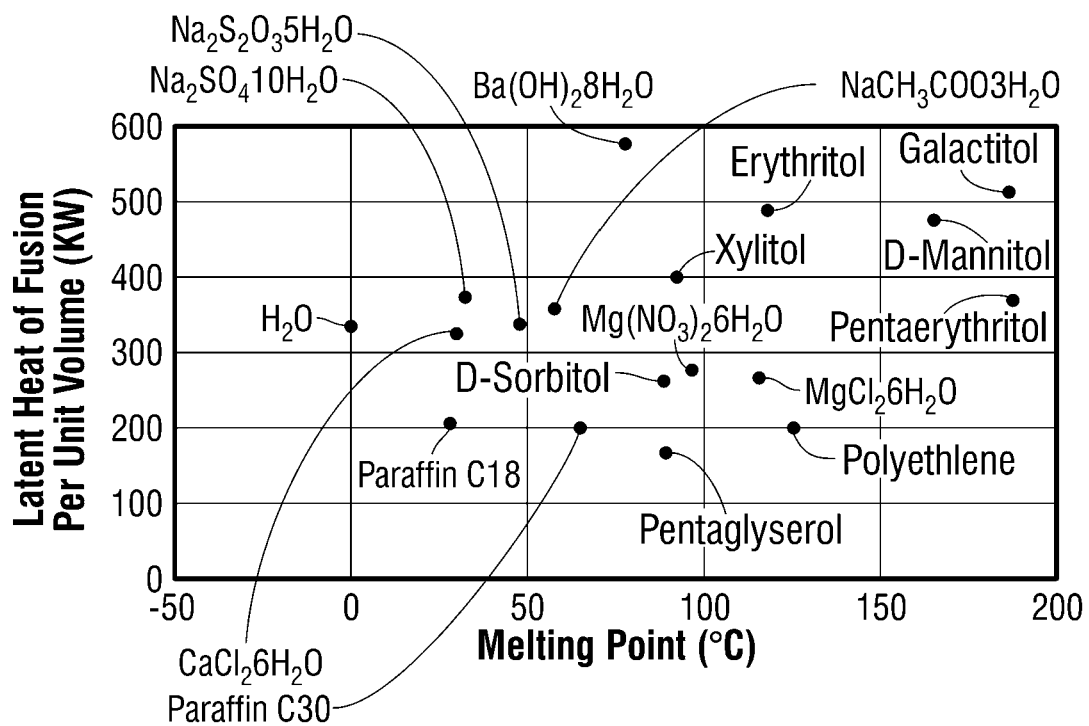
FIG. 6 is a graph illustrating the latent heat of fusion per unit volume of various phase change materials, according to an embodiment of the present invention.

As discussed previously, suitable phase change materials 32 comprise sugar alcohols, which are inherently safe and have high latent heats of fusion. The sugar alcohol materials also melt over a reasonably wide range of temperatures. Phase change materials such as erythritol, xylitol, combinations of erythritol and xylitol, combinations of D-mannitol and xylitol, and combinations of erythritol, xylitol and D-mannitol, perform well in helping extend the time duration over which logging tool 24 is able to operate in the hot, subterranean environment. In FIG. 5, additional and/or alternate examples of suitable phase change material candidates of the sugar alcohol family are listed in a table providing corresponding characteristics of the phase change material. Similarly, FIG. 6 provides a graphical illustration listing the melting point and latent heat of fusion for a variety of sugar alcohols and other types of potential phase change materials 32 which can be employed to insulate the logging tool 24 from heat.

In one specific example of logging tool protection assembly 26, the flask 30 is constructed with BMI/R-glass fiber-reinforced material, and the phase change material 32 is formed from erythritol. The logging tool protection assembly 26 is deployed in an observation well during a TAGOGD enhanced oil recovery application and experiences high temperatures from the injected steam. The erythritol experiences volume changes up to 10 percent due to thermal expansion. In this example, the flask 30 is formed as a long tube which may be on the order of several meters long. The diameter of the tubular flask 30 is selected to fit within an open wellbore 40.

In this particular embodiment, the long tubular flask 30 is deployed in a post-steam injection open hole observation well having a temperature profile which substantially increases in temperature and then decreases in temperature in a downhole direction along the observation well. For example, the top portion of the open hole wellbore 40 may be at a relatively cool temperature, e.g. 50° C., followed below by a heated "steam chest" portion of the well which may be at 250° C. or greater. Water beneath the steam chest again lowers the temperature to, for example, 50° C. The temperatures listed are merely examples, and the actual temperatures and temperature gradients will change depending on the environment and type of enhanced oil recovery operation.

However, the cooler regions along the wellbore enable cooling of the logging tool protection assembly 26. The flask 30 and logging tool 24 can be rapidly moved into one of the cooler environments via wireline cable 46. In one application, the logging tool protection assembly 26 is rapidly moved into the water rim beneath the oil rim 64 of the formation and left stationary for a desired time, e.g. five to seven hours, to sufficiently cool. Once cool, the logging tool protection assembly 26 is moved back into the steam chest for an additional period, e.g. one to two hours, of logging. In one specific example, the "hot" logging time is approximately 60 minutes and the cooling period is on the order of up to seven hours. By moving the logging tool protection assembly 26 between "cool" and "hot" regions, two hours of logging within the hot region of the well can be achieved in a 12 hour day.

The various components of logging tool protection assembly 26 may be sized and configured for a given application. Additionally, the materials selected for use in constructing flask 30 and phase change material 32 may be adjusted as necessary to accommodate the parameters of a specific logging operation. In one example, the flask 30 is formed as a tubular member using BMI/R-glass tow pregs or equivalent slit tapes according to the process described in U.S. Patent Application Publication 2009/0236091, which is incorporated herein by reference. The fiber-reinforced material may be coated with a variety of hydrophobic, low modulus and chemically compatible coatings provided the coatings are transparent with respect to the operation of nuclear magnetic resonance logging tools. Such coatings may also be abrasion resistant. Additionally, end fittings may be used to couple together sections of fiber-reinforced plastic flask 30. By way of example, the end fittings may be formed as threaded couplings through compression molding techniques using suitable fiber-reinforced plastic materials. The end fittings and tubular sections of flask 30 may be sealed together with appropriate seals, such as o-rings. In this design, all exposed surfaces may be covered by mating components, and no machined surface is exposed to the fluid media. Additionally, fluid may be contained inside the flask by forming double taper contacts between components in combination with suitable seals, such as o-rings, able to function in the hot, subterranean environment.

By way of further example, adapter subs may be used to join the non-metallic flask 30 with metal components, such as metal pipe. In such case, the adapter sub may be designed to employ matching buttress threads such as those used for steel casing. The examples provided above are just a few examples of the alternate constructions and supplemental components which may be used to design a variety of flasks 30 suitable for a variety of logging operations in which the logging tool 24 is insulated.

Regardless of the specific construction and content of flask 30 and phase change material 32, these components cooperate to insulate and protect the logging tool 24 within logging tool protection assembly 26. The flask 30 and phase change material 32 insulate the logging tool 24 from the surrounding environment while also providing a heat sink for heat generated internally by the logging tool. Consequently, the sonde/sensor section of the logging tool 24 is allowed to operate in hot, subterranean environments for a substantially longer period of time without exceeding its temperature limit rating.

Figure 7:
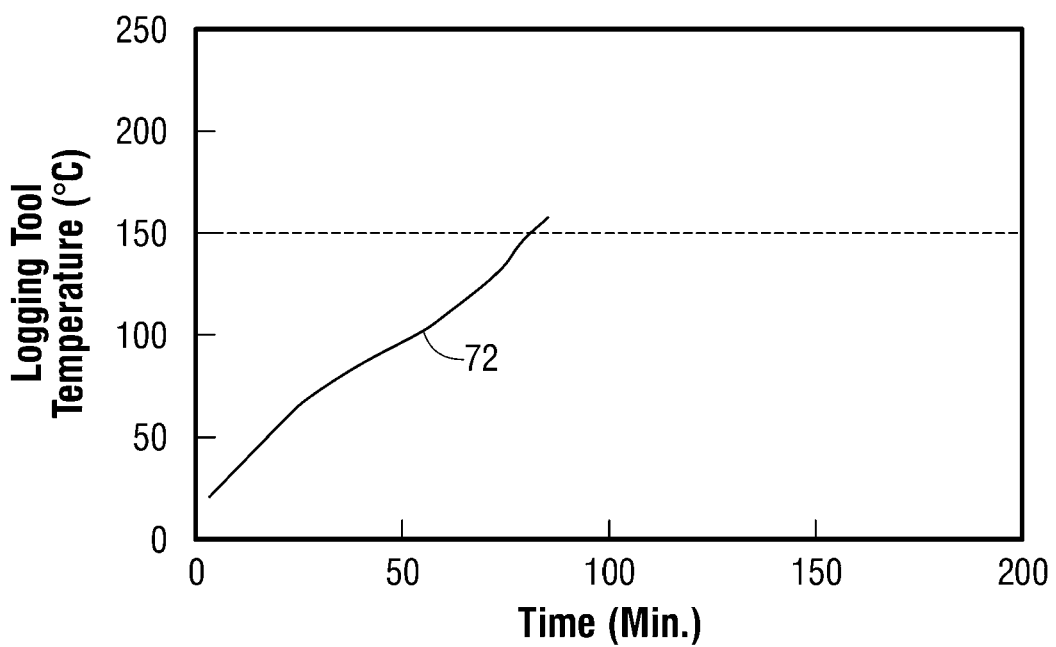
FIG. 7 is a graph illustrating the thermal protection afforded by placement of a logging tool in a non-metallic flask, according to an embodiment of the present invention.

In FIG. 7, a graph is provided to illustrate the substantial period of time the logging tool 24 may be employed in a hot, subterranean environment, such as the 250° C. (or greater) environment experienced by the steam chest region during an enhanced oil recovery operation employing steam injection. The flask 30 and phase change material 32 protect the logging tool 24 from external heat, while the phase change material 32 effectively acts as a heat sink to store heat generated internally by the logging tool. As a result, extended logging operations can be performed in hot, e.g. 250° C., subterranean environments, as indicated by graph line 72 which shows only a gradual warming inside flask 30 when the flask is placed in the hot environment, allowing for a logging time, in this example, of about 80 minutes before the 150° C. temperature limit of logging tool 24 is reached. This insulating capability substantially enhances the ability to collect desired information/data during steam assisted operations and other operations in which the logging tool would potentially be subjected to a temperature above its temperature limit rating.

The embodiments described above provide examples of designs for the logging tool protection assembly 26 and various related components. However, the size, configuration, and materials employed may vary from one application to another. Similarly, the type of logging tool 24 employed to collect data on the surrounding formation may differ from one environment to another. The flask 30, phase change material 32, and other components also may be adjusted to accommodate the specific sensing techniques, temperature limit ratings, or other parameters of the logging tool 24. For example, the materials from which flask 30 is constructed are chosen so as to remain effectively transparent to the sensing technique employed. Furthermore, the type of oil recovery application or other well-related application in which logging tool protection assembly 26 is utilized may vary substantially.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A system for logging in high temperature, subterranean environments, comprising:
   a non-metallic flask sized for placement in a wellbore;
   a logging tool disposed within the non-metallic flask; and
   a phase change material placed within the non-metallic flask in a molten state to a level covering the logging tool and thereafter allowed to solidify, wherein an expansion space is left in the flask to accommodate thermal expansion of the phase change material, and the non-metallic flask and the phase change material facilitate operation of the logging tool in high temperature environments in the wellbore.

2. The system as recited in claim 1, wherein the non-metallic flask is formed with a fiber-reinforced plastic material.

3. The system as recited in claim 2, wherein the fiber-reinforced plastic material comprises bismaleimide.

4. The system as recited in claim 3, wherein the fiber-reinforced plastic material comprises fibers selected from the group consisting of glass fibers, basalt fibers, and aramid fibers.

5. The system as recited in claim 1, wherein the logging tool comprises a nuclear magnetic resonance tool.

6. The system as recited in claim 1, wherein the logging tool comprises an induction tool.

7. The system as recited in claim 1, wherein the logging tool comprises a nuclear tool.

8. The system as recited in claim 1, wherein the phase change material comprises a sugar alcohol material.

9. The system as recited in claim 8, wherein the sugar alcohol material is erythritol.

10. The system as recited in claim 8, wherein the sugar alcohol material is xylitol.

11. The system as recited in claim 8, wherein the sugar alcohol material is a combination of erythritol and xylitol.

12. The system as recited in claim 8, wherein the sugar alcohol material is a combination of D-mannitol and xylitol.

13. The system as recited in claim 8, wherein the sugar alcohol material is a combination of erythritol, xylitol, and D-mannitol.

14. The system as recited in claim 1, further comprising an eccentralizer to bias the non-metallic flask against a wellbore wall.

15. The system as recited in claim 1, further comprising a tool centralizer located within the non-metallic flask to centralize the logging tool along a longitudinal axis of the non-metallic flask.

16. The system as recited in claim 1, wherein the non-metallic flask comprises abrasion resistant end caps.

17. The system as recited in claim 1, wherein the non-metallic flask is coated with an abrasion resistant coating.

18. The system as recited in claim 1, further comprising a wireline to deploy the logging tool downhole into the wellbore.

19. A method for logging, comprising:
placing a logging tool in a non-metallic flask sized for movement along a wellbore; and
surrounding the logging tool with a molten phase change material disposed within the non-metallic flask, wherein an expansion space is left in the flask to accommodate thermal expansion of the phase change material, and wherein the phase change material is allowed to solidify before the logging tool and flask are placed in the wellbore.

20. The method as recited in claim 19, further comprising moving the non-metallic flask along the wellbore to a desired logging region.

21. The method as recited in claim 20, further comprising periodically cooling the non-metallic flask and the logging tool by moving the non-metallic flask and the logging tool to a cooler region of the wellbore or a surface location.

22. The method as recited in claim 19, further comprising performing a logging operation during an enhanced oil recovery operation employing steam injection.

23. The method as recited in claim 19, wherein placing the logging tool in the non-metallic flask comprises placing the logging tool in a flask formed of materials effectively transparent to nuclear magnetic resonance.

24. A method for logging, comprising:
selecting a logging tool having a temperature limit rating;
surrounding the logging tool with a molten phase change material which is allowed to solidify, wherein the phase change material is held around the logging tool in a non-metallic flask having therein a space to accommodate thermal expansion of the phase change material;
thereafter moving the logging tool, the surrounding solid phase change material, and the flask to a subterranean location having a temperature higher than the temperature limit rating of the logging tool; and
performing a logging operation along the subterranean location.

25. The method as recited in claim 24, further comprising limiting heat build-up in the logging tool by temporarily moving the logging tool to a cooler, subterranean region.

26. The method as recited in claim 24, further comprising radially centering the logging tool in the non-metallic flask.

27. The method as recited in claim 24, wherein the non-metallic flask is a fiber-reinforced plastic flask.

28. The method as recited in claim 24, further comprising biasing the non-metallic flask against a wellbore wall during the logging operation.

\* \* \* \* \*

UNITED STATES PATENT AND TRADEMARK OFFICE
CERTIFICATE OF CORRECTION

PATENT NO.         : 8,439,106 B2
APPLICATION NO.    : 12/721375
DATED              : May 14, 2013
INVENTOR(S)        : Ahmed Hammami et al.

Page 1 of 1

It is certified that error appears in the above-identified patent and that said Letters Patent is hereby corrected as shown below:

On the title page item (75), the 3rd inventor's name

Incorrect: BEMADETTE

Correct: BERNADETTE

Signed and Sealed this
Third Day of September, 2013

Teresa Stanek Rea
*Acting Director of the United States Patent and Trademark Office*